United States Patent
Li et al.

(10) Patent No.: US 9,521,710 B2
(45) Date of Patent: Dec. 13, 2016

(54) DOOR OPENING STRUCTURE FOR MICROWAVE OVEN

(75) Inventors: Zhigang Li, Guangdong (CN); Zhihua Chen, Guangdong (CN); Jie Li, Guangdong (CN); Cheng Jiang, Guangdong (CN)

(73) Assignee: Guangdong Galanz Microwave Oven and Electrical Appliances Manufacturing Co., Ltd., Guangdong (CN)

( * ) Notice: Subject to any disclaimer, the term of this patent is extended or adjusted under 35 U.S.C. 154(b) by 496 days.

(21) Appl. No.: 14/117,243

(22) PCT Filed: Jan. 30, 2012

(86) PCT No.: PCT/CN2012/070779
§ 371 (c)(1),
(2), (4) Date: Jan. 23, 2014

(87) PCT Pub. No.: WO2012/152093
PCT Pub. Date: Nov. 15, 2012

(65) Prior Publication Data
US 2014/0332524 A1  Nov. 13, 2014

(30) Foreign Application Priority Data
May 12, 2011 (CN) .......................... 2011 1 0121760

(51) Int. Cl.
*H05B 6/64* (2006.01)
*E05F 5/00* (2006.01)
(Continued)

(52) U.S. Cl.
CPC .............. *H05B 6/6414* (2013.01); *E05F 5/00* (2013.01); *F24C 15/023* (2013.01); *A47J 36/12* (2013.01);
(Continued)

(58) Field of Classification Search
CPC ......... E05F 5/00; E05F 1/1215; F24C 15/023; H05B 6/6414; E05Y 2900/308; E05Y 2201/20; E05Y 2201/264; E05Y 2201/21; E05Y 2201/256; A47J 36/12
(Continued)

(56) References Cited

U.S. PATENT DOCUMENTS

| 4,103,392 A * | 8/1978 | MacDonald .............. E05F 3/20 16/54 |
| 4,188,867 A | 2/1980 | DeRemer |
| 2013/0319394 A1 * | 12/2013 | Yantis ................... F24C 15/023 126/194 |

FOREIGN PATENT DOCUMENTS

| CN | 1435555 A | 8/2003 |
| CN | 2747339 A | 12/2005 |

(Continued)

OTHER PUBLICATIONS

International Search Report dated May 10, 2012 from corresponding PCT Application No. PCT/CN2012/070779.
(Continued)

Primary Examiner — Quang Van
(74) Attorney, Agent, or Firm — Maier & Maier, PLLC

(57) ABSTRACT

A door opening structure for microwave oven includes an upper hinge fastened on a door body assembly, and a lower hinge fastened on a oven body of a microwave oven, wherein the door body assembly is hinged with the oven body by the upper hinge and the lower hinge. An elastic element is provided between the upper hinge and the lower hinge, and the upper hinge is connected with a damper. Both ends of the upper hinge are provided with first connectors that are hinged with the lower hinge, and the middle portion of the upper hinge is provided with second connectors that are hinged with one end of the damper by spring pins.

9 Claims, 2 Drawing Sheets

(51) Int. Cl.
  *F24C 15/02* (2006.01)
  *E05F 1/12* (2006.01)
  *A47J 36/12* (2006.01)

(52) U.S. Cl.
  CPC .......... *E05F 1/1215* (2013.01); *E05Y 2201/20* (2013.01); *E05Y 2201/21* (2013.01); *E05Y 2201/256* (2013.01); *E05Y 2201/264* (2013.01); *E05Y 2900/308* (2013.01)

(58) Field of Classification Search
  USPC ....... 219/739–743; 126/194, 198; 16/82, 83, 16/62, 54, 277, 286, 221
  See application file for complete search history.

(56) References Cited

FOREIGN PATENT DOCUMENTS

| | | |
|---|---|---|
| CN | 1873178 A | 12/2006 |
| CN | 101379348 A | 3/2009 |
| CN | 101688414 U | 3/2010 |
| CN | 101849076 A | 9/2010 |
| CN | 201662115 U | 12/2010 |
| CN | 201662117 U | 12/2010 |
| CN | 201771310 U | 3/2011 |
| CN | 102052391 A | 5/2011 |
| CN | 102168866 A | 8/2011 |
| CN | 202074581 U | 12/2011 |
| DE | 202010012730 U1 | 12/2010 |
| EP | 1239225 A2 | 9/2002 |
| FR | 2866539 A1 | 8/2005 |
| GB | 2245310 A | 1/1992 |
| JP | 2-224708 A | 9/1990 |
| TW | 288084 U | 2/2006 |
| WO | 2007/088141 A1 | 8/2007 |

OTHER PUBLICATIONS

Chinese Search Report dated May 12, 2011, in connection with corresponding CN Application No. 201110121760.4.
Chinese Office Action dated Feb. 16, 2012, in connection with corresponding CN Application No. 201110121760.4.
Supplementary European Search Report dated Apr. 8, 2015, in connection with corresponding EP Application No. 12782405.0.

\* cited by examiner

DOOR OPENING STRUCTURE FOR MICROWAVE OVEN

FIELD OF THE INVENTION

The present disclosure relates generally to the technical field of microwave oven, and more particularly, to a door opening structure for microwave oven.

BACKGROUND OF THE INVENTION

For microwave ovens on the market at present, there are several ways to open the door, e.g. to open the door by a door hook cooperating with a button handle, to open the door by a pull-down door controlled by a torsional spring, etc. For example, an open-door mechanism for microwave oven has been disclosed on Dec. 1, 2010 in a Chinese Patent document NO. CN201662115U in the name of the present applicant, wherein the microwave oven includes an oven body provided with a cooking cavity and a computer control panel, a oven door is provided at the opening of the cooking cavity, a door hook is provided in the oven door, a switch bracket fastened with the door hook is provided in the cooking cavity, an electronic control open-door mechanism is provided in the oven body for controlling the switch bracket and the door hook to separate, which is connected with the computer control panel, and the computer control panel is also electrically connected with an identification device that sends a control signal to the electronic control open-door mechanism. However, at the rapid changes in technology today, the above door opening methods for microwave ovens cannot meet the demand for using in combination with high-end products, so it needs further improvements.

SUMMARY OF THE INVENTION

In view of the above, it is an object of the present disclosure to provide a door opening structure for microwave oven, which is simply designed, reasonably structured and has a good damping effect, to overcome the deficiency of the technology in existence.

According to the object of the present disclosure, a door opening structure for microwave oven includes an upper hinge fastened on a door body assembly, and a lower hinge fastened on a oven body of a microwave oven, wherein the door body assembly is hinged with the oven body by the upper hinge and the lower hinge, an elastic element is provided between the upper hinge and the lower hinge, and the upper hinge is connected with a damper.

Preferably, both ends of the upper hinge are provided with first connectors that are hinged with the lower hinge, and the middle portion of the upper hinge is provided with second connectors that are hinged with one end of the damper by spring pins.

Preferably, the other end of the damper is hinged with a connection member fastened on the microwave oven.

Preferably, the damper is a hydraulic damper.

Preferably, both ends of the lower hinge are provided with third connectors corresponding to the first connectors of the upper hinge, the middle portion of the lower hinge is provided with an escape opening corresponding to the damper, and both sides of the escape opening are provided with fourth connectors.

Preferably, both ends of the upper hinge are respectively hinged with both ends of the lower hinge by the torsional spring pin sequentially passing through the third connectors, the first connectors and the fourth connectors.

Preferably, the two torsional spring pins are respectively provided with torsional springs.

Preferably, one end of each torsional spring is inserted into the first connector and fastened on the first connector, and the other end of the torsional spring is fixed on a catching groove of the fourth connector.

Preferably, the upper hinge is provided with a limiting wall which limits the open angle of the upper hinge, and the lower hinge is provided with a limiting protrusion corresponding to the limiting wall.

Preferably, the door body assembly is provided with a door hook.

In the above technical solution, the door body assembly is hinged with the oven cavity by the upper hinge and the lower hinge, between the upper hinge and the lower hinge is arranged a torsional spring, the upper hinge is connected with a damper, the door body assembly of the oven can be smoothly opened under the together action of torsional spring force and damping in safety and reliability. Meanwhile, it has advantages of sample and rational structure, wide application range, low cost and easy assembly and installation.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DESCRIPTION OF THE REFERENCE SIGNS

1 upper hinge, 1.1 limiting wall, 1.6 first connector, 1.7 second connector, 2 lower hinge, 2.1 limiting protrusion, 2.2 catching groove, 2.5 third connector, 2.6 opening, 2.7 fourth connector, 3 torsional spring, 4 torsional spring pin, 5 damper, 6 spring pin, 7 door body assembly and 7.1 door hook.

DETAILED DESCRIPTION OF THE INVENTION

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
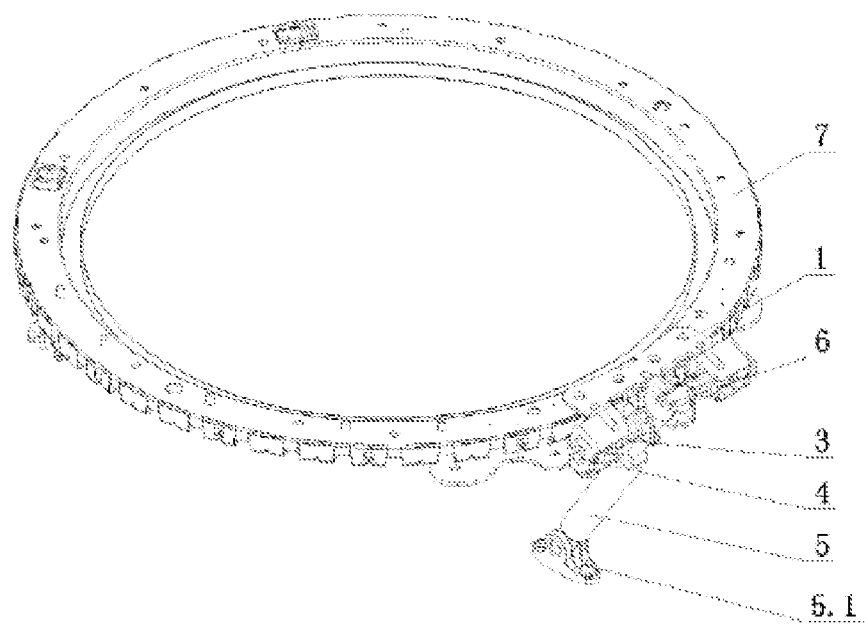
FIG. 1 is a schematic diagram illustrating a door opening structure for microwave oven according to one embodiment of the present disclosure.
Figure 2:
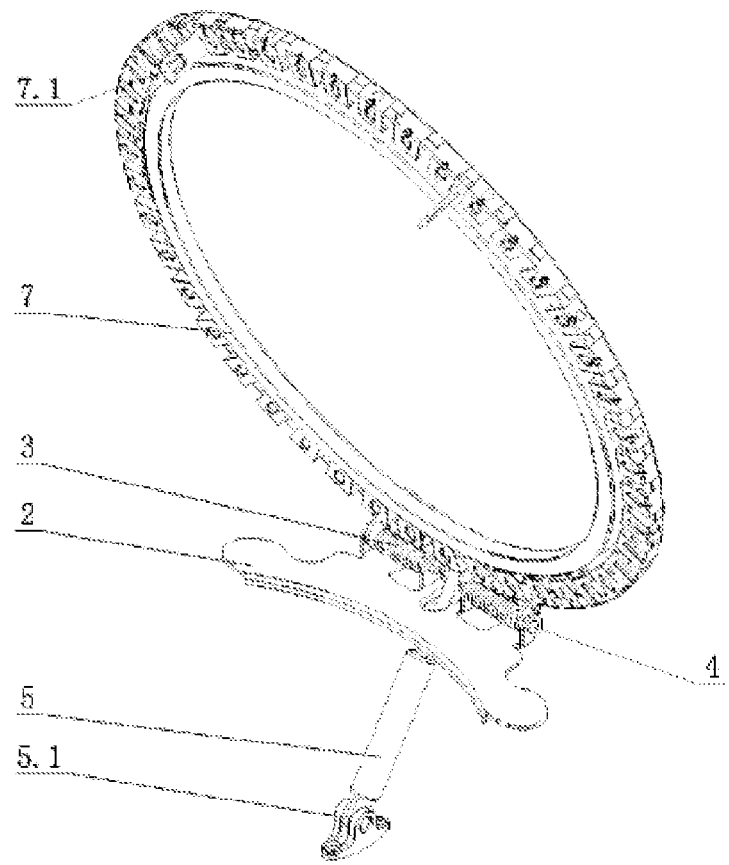
FIG. 2 is a schematic diagram illustrating a door opening structure for microwave oven according to another embodiment of the present disclosure.
Figure 3:
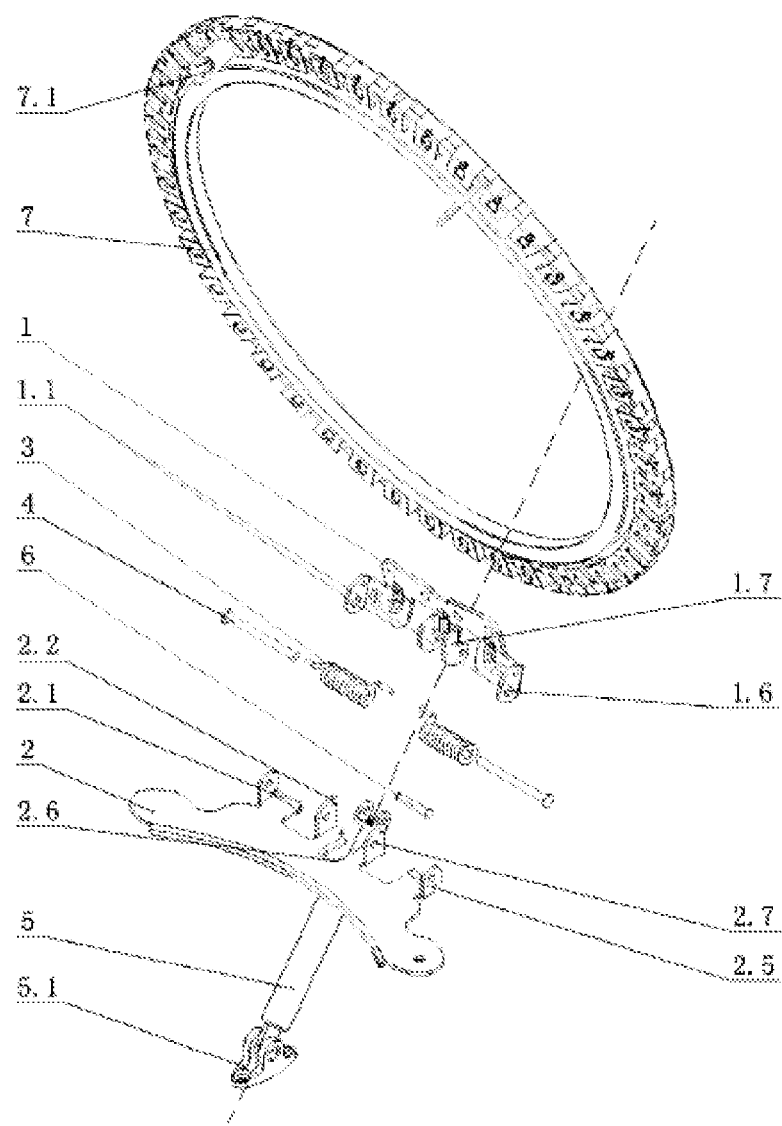
FIG. 3 is an exploded diagram illustrating a door opening structure for microwave oven according to one embodiment of the present disclosure.
Figure 4:
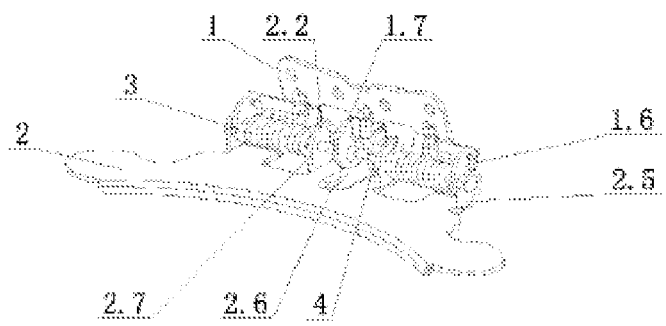
FIG. 4 is a structure diagram illustrating an assembly of an upper hinge and a lower hinge according to one embodiment of the present disclosure.

In one embodiment of the present disclosure, as shown in FIGS. 1-4, a door opening structure for microwave oven includes an upper hinge 1 fastened on a door body assembly 7, and a lower hinge 2 fastened on a oven body of a microwave oven, wherein the door body assembly 7 is hinged with the oven body by the upper hinge 1 and the lower hinge 2, between the upper hinge 1 and the lower hinge 2 is arranged a elastic element, and the upper hinge 1 is connected with a damper 5.

Both ends of the upper hinge 1 are provided with first connectors 1.6 that are hinged with the lower hinge 2, and the middle portion of the upper hinge 1 is provided with second connectors 1.7 that are hinged with one end of the damper 5 by spring pins 6. The other end of the damper 5 is hinged with a connection member 5.1 fastened on the microwave oven. Wherein, the damper 5 is a hydraulic damper.

Both ends of the lower hinge 2 are provided with third connectors 2.5 corresponding to the first connectors 1.6 of the upper hinge 1, the middle portion of the lower hinge 2 is provided with an escape opening 2.6 corresponding to the damper 5, and both sides of the escape opening 2.6 are provided with fourth connectors 2.7. Both ends of the upper hinge 1 are respectively hinged with both ends of the lower hinge 2 by torsional spring pins 4 sequentially passing through the third connectors 2.5, the first connectors 1.6 and the fourth connectors 2.7. The two torsional spring pins 4 are respectively provided with torsional springs 3. One end of each torsional spring 3 is inserted into the first connector 1.6 and fastened on the first connector 1.6, and the other end of the torsional spring 3 is fixed on a catching groove 2.2 of the fourth connector 2.7.

The upper hinge 1 is provided with a limiting wall 1.1 which limits the open angle of the upper hinge 1, and the lower hinge 2 is provided with a limiting protrusion 2.1 corresponding to the limiting wall 1.1. The door body assembly 7 is provided with a door hook 7.1.

When the door body assembly 7 of the microwave oven is closing, an interlocking mechanism (not shown) placed on the microwave oven cavity (not shown) is fixed with the door hook 7.1 of the door body assembly 7, the torsional spring 3 is in compressed state, and the damper 5 is in no-force bearing state.

When the door body assembly 7 of the microwave oven is opening, the interlocking mechanism (not shown) placed on the microwave oven cavity (not shown) is separated from the door hook 7.1 of the door body assembly 7, the door body assembly 7 is opened under the action of the restoring force of the torsional spring 3, meanwhile, the damper 5 is under pressure and acts as cushioning, which provides damping effect to the door body assembly 7 when it is open. It effectively prevents the door body assembly 7 automatically quickly opening under the action of the restoring force of the torsional spring 3 after the interlocking mechanism (not shown) is separated from the door hook 7.1; and it does not need to turn down the restoring force of the torsional spring 3 for preventing the door body assembly 7 quickly opening that will make the door body assembly 7 unable to automatically open. Wherein, the open angle of the door body assembly 7 is limited under the common action of the limiting protrusion 2.1 of the lower hinge 2 and the limiting wall 1.1 of the lower hinge.

When the door body assembly 7 of the microwave oven is re-closing, the torsional spring 3 is gradually compressed until the door hook 7.1 is fixed with the interlocking mechanism (not shown) again, when the torsional spring 3 is in the maximum compression and it bears the maximum torsion, the damper 5 is released and in no-force bearing state again, and the door body assembly 7 is close.

The embodiments are chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present invention pertains without departing from its spirit and scope. Accordingly, the scope of the present disclosure is defined by the appended claims rather than the foregoing description and the exemplary embodiments described therein.

The invention claimed is:

1. A door opening structure for a microwave oven, comprising:
   an upper hinge fastened on a door body assembly,
   a lower hinge fastened on an oven body of a microwave oven,
   wherein the door body assembly is hinged with the oven body by the upper hinge and the lower hinge,
   an elastic element is provided between the upper hinge and the lower hinge,
   the upper hinge is connected with a damper,
   both ends of the upper hinge are provided with first connectors that are hinged with the lower hinge, and
   the middle portion of the upper hinge is provided with second connectors that are hinged with one end of the damper by spring pins.

2. The door opening structure of claim 1, wherein the other end of the damper is hinged with a connection member fastened on the microwave oven.

3. The door opening structure of claim 2, wherein the damper is a hydraulic damper.

4. The door opening structure of claim 1, wherein both ends of the lower hinge are provided with third connectors corresponding to the first connectors of the upper hinge, the middle portion of the lower hinge is provided with an escape opening corresponding to the damper, and both sides of the escape opening are provided with fourth connectors.

5. The door opening structure of claim 4, wherein the both ends of the upper hinge are respectively hinged with the both ends of the lower hinge by torsional spring pins sequentially passing through the third connectors, the first connectors and the fourth connectors.

6. The door opening structure of claim 5, wherein the two torsional spring pins are respectively provided with torsional springs.

7. The door opening structure of claim 6, wherein one end of each torsional spring is inserted into the first connector and fastened on a first connector, and the other end of the torsional spring is fixed on a catching groove of a fourth connector.

8. The door opening structure of claim 7, wherein the upper hinge is provided with a limiting wall which limits an open angle of the upper hinge, and the lower hinge is provided with a limiting protrusion corresponding to the limiting wall, so that during the process of opening the door, the upper hinge rotates relative to the lower hinge, and when the upper hinge turns to a certain angle, the limiting protrusion of the lower hinge touches the limiting wall of the upper hinge, so as to prevent the door from continuing to turn, and therefore to limit the open angle.

9. The door opening structure of claim 1, wherein the door body assembly is provided with a door hook.

* * * * *